Patented Nov. 19, 1946

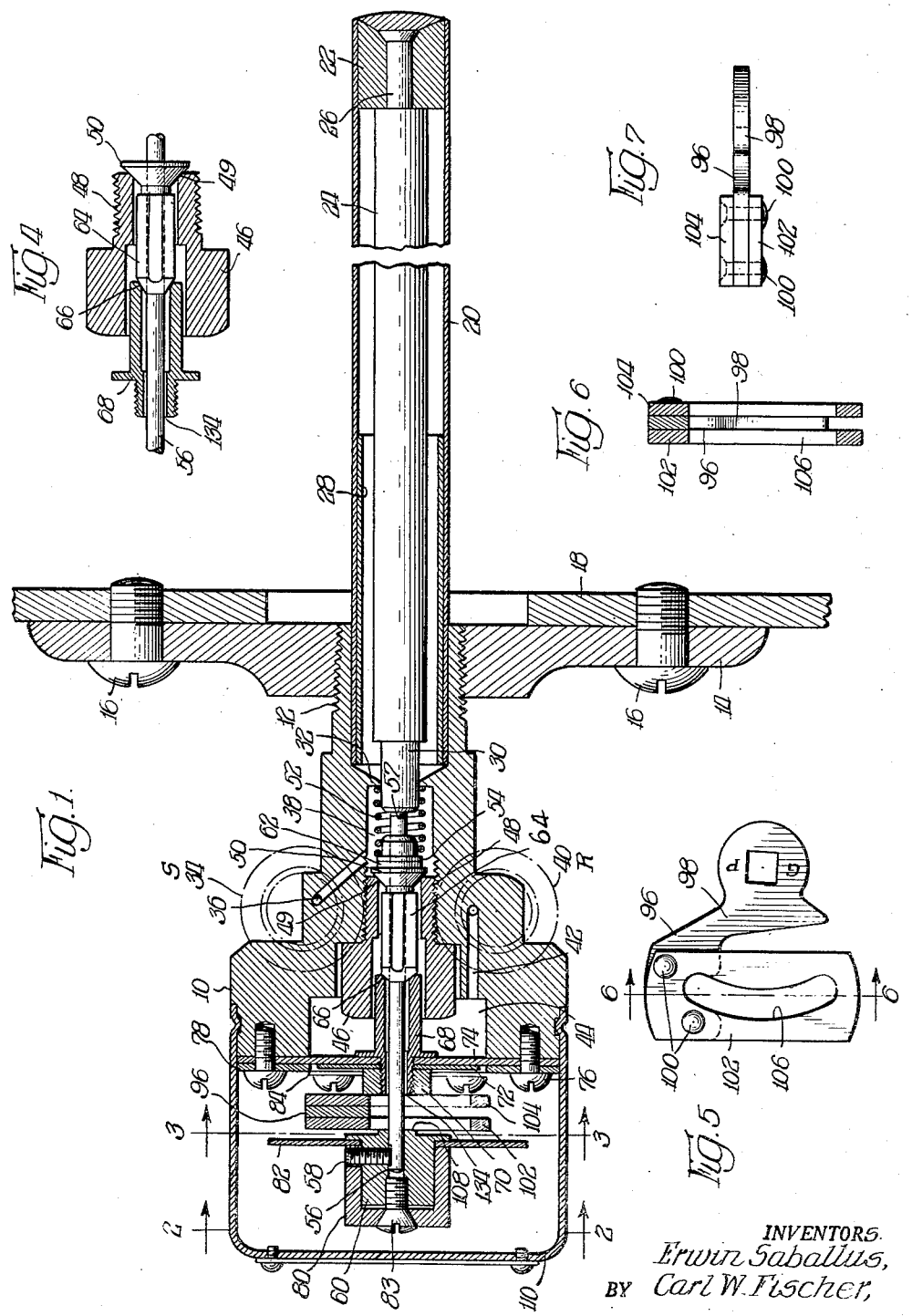

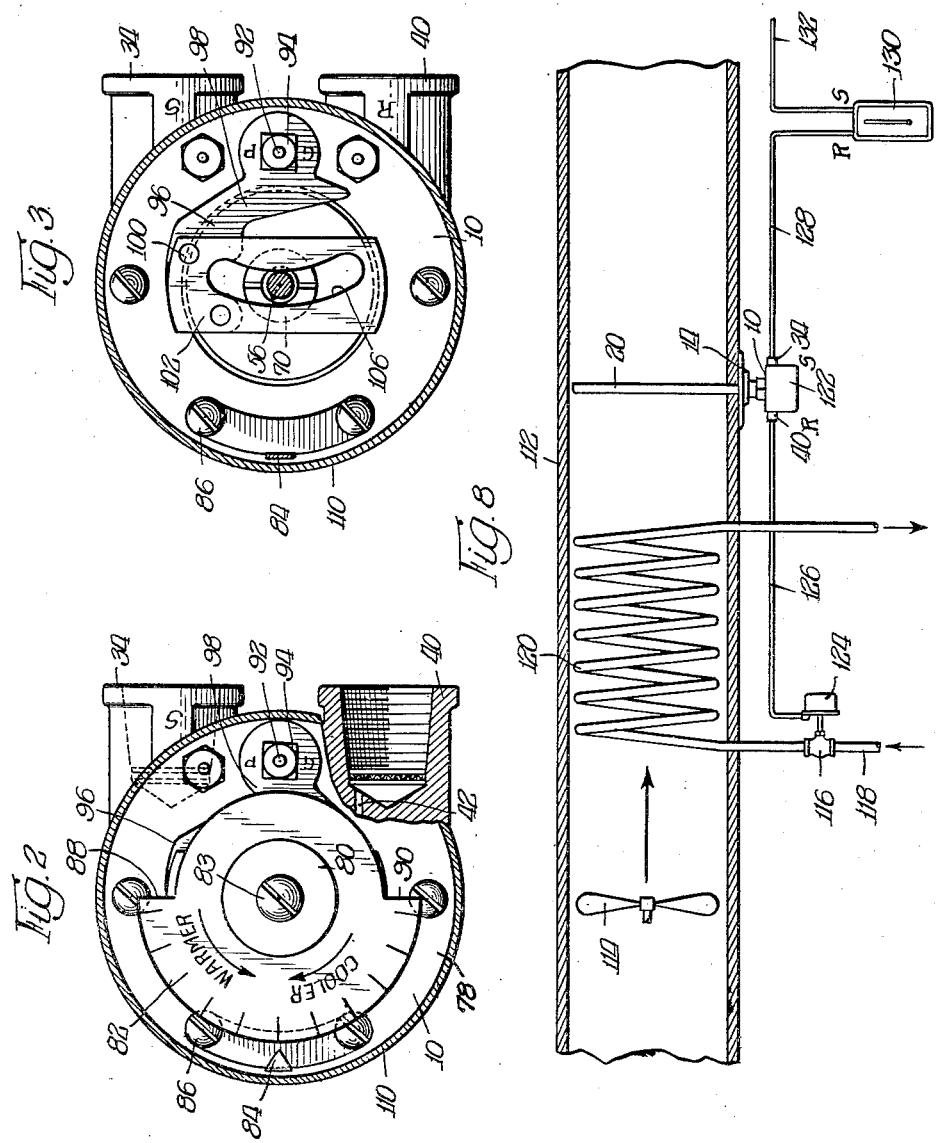

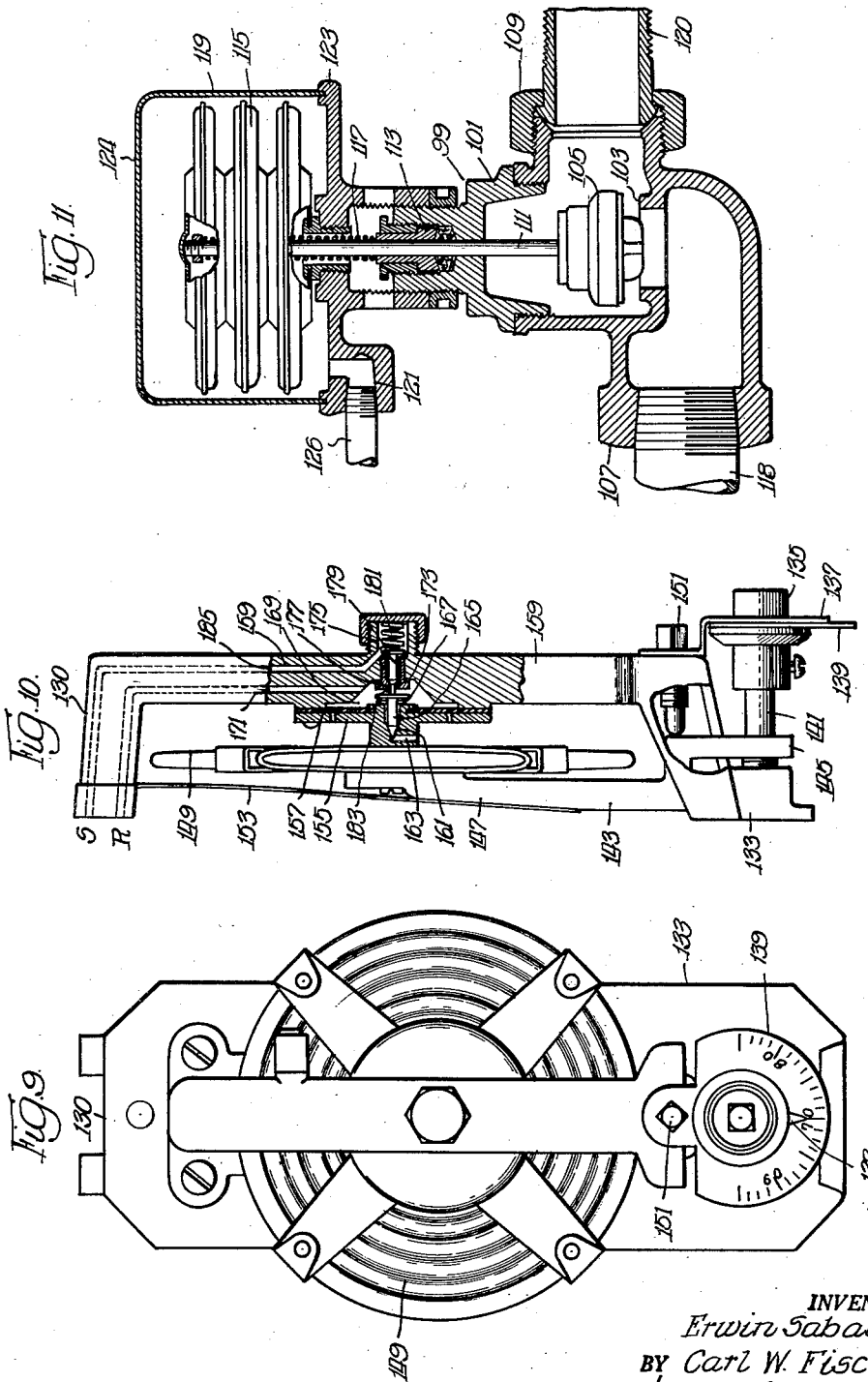

2,411,295

UNITED STATES PATENT OFFICE 2,411,295

CONTROL MECHANISM

Erwin Saballus and Carl W. Fischer, Chicago, Ill., assignors to The Powers Regulator Company, Chicago, Ill., a corporation of Illinois Application January 5, 1944, Serial No. 517,026

13 Claims. (Cl. 236—87)

This invention pertains to a thermostat and, more particularly, to an air stream thermostat for use in controlling the temperature of air delivered to an enclosure.

In the old type of air stream thermostat, there is a fixed relation between the change of temperature and the change in control pressure (this ratio being called sensitivity), for example, for a one degree change in temperature there is a set, or fixed change in the pressure which cannot be varied for that degree without changing the construction of the thermostat. In other words, after the installation of the device an adjustment cannot be made in the field. This is, of course, very disadvantageous, because the control cannot then be accurate. The temperature cannot be steadily maintained and, consequently, a fluctuation in temperature occurs.

In devices of this character the control member gives only very small movements, that is, for a one degree change the control member, for example, may move only one and one half ten thousandths of an inch. The old devices made use of a control operating through a lever, a linkage, or a yoke, and, consequently, the control valves did not operate for a one degree change in temperature, as lost motion occurred in the linkage or lever, or bending occurred in the yoke. In the old device a lever was desirable to operate the valve, as otherwise enough motion could not be attained to close the valve, as the resilience of the lever was fixed, the sensitivity was fixed, whereas in the present device an object is to provide adjusting means which increases the sensitivity.

Another object of the invention is to provide means whereby the sensitivity of the thermostat may be adjusted after installation without having to change the construction of the thermostat.

Another object of the invention is to provide a thermostat wherein the range of sensitivity is adjustable.

Another object of the invention is to provide a thermostat which is inexpensive to make and can be readily substituted for the old form of thermostat in existing installations.

Another object of the invention is to provide a thermostat utilizing an Invar or like rod in the control means, which rod causes actuation of the control valves.

Another object of the invention is to provide a thermostat wherein the operation is only by compression or tension, that is, all beams, levers and yokes are omitted so that not only can it be made more cheaply and accurately, and with less parts, but all bending or lost motion in the parts is eliminated.

Another object of the invention is to provide a thermostat which can be made as a very small unit, which is advantageous in that in some installations there is not much room for the mounting of the device.

Another object of the invention is to provide a thermostat wherein when there is no temperature change no air is being used from the compressor, thereby eliminating noise and the wear and tear on the compressor.

Another object of the invention is to provide a thermostat wherein the points of application of the pressure to the valves or other control parts, due to temperature change, is in line with the operating member (Invar rod) whereby any change in temperature causes an immediate operation of the control valves so that there will always be a response without delay for small temperature changes.

Another object of the invention is to provide a thermostat which prevents cycling. For example, there will not be large or many changes in the steam valve which is controlled by the thermostat, so that the steam coil will not be overheated and underheated in the air supply duct, which happens where a thermostat of fixed sensitivity is used. The increased sensitivity of the present device and the fact that it can be adjusted prevents this cycling from occurring.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a fragmentary sectional elevation through a form of duct thermostat embodying the invention;

Figure 2 is a plan view, partly in section, of the control end of the duct thermostat, the same being taken substantially in the plane as indicated by the line 2—2 of Figure 1;

Figure 3 is a plan view, partly in section, of the control end of the duct thermostat showing the throttling spring, the view being taken substantially in the plane as indicated by the line 3—3 of Figure 1;

Figure 4 is an enlarged sectional elevation of the supply and exhaust valve assembly;

Figure 5 is a top plan view of the throttling spring assembly;

Figure 6 is a sectional elevation taken substantially in the plane as indicated in line 6—6 of Figure 5;

Figure 7 is an end elevation, looking toward the top, of the throttling spring assembly illustrated in Figure 5;

Figure 8 is a diagrammatic representation of one form of installation of the thermostat shown in Figure 1;

Figure 9 is an elevation of a room thermostat used in the form of installation (and others) illustrated in Figure 8;

Figure 10 is an enlarged sectional side elevation of the room thermostat shown in Figure 9; and, Figure 11 is an enlarged sectional elevation of the valve control or operating member shown in Figure 8.

Referring first of all more particularly to the duct thermostatic device illustrated in Figures 1 to 7 inclusive, the device comprises the base mounting 10 threaded as at 12 for the reception of corresponding threads of the securing flange 14, said flange being adapted to be fastened as at 16 to one wall of the duct 18. The base mounting is provided with the temperature sensitive (copper) tube 20 which extends into the duct and is provided with the plug 22 secured to said tube and to the inner Invar rod 24 as at 26. A reinforcing tube 28 may be provided in the tube 20 adjacent the base mounting. The tube 20 is made pressure tight and the rod 24 is provided with the guide or bearing portion 30 extending through a complementary guide and spring seat 32 provided in the base mounting.

The base mounting is provided with a supply fitting 34 (S) which is adapted to be connected to a source of pressure supply and communicates with a channel or passage 36 which communicates with the supply valve chamber 38. The base mounting is also provided with a control pressure fitting 40 (R) adapted to be connected to control means such as a steam valve (Figure 11), and said fitting communicates with the channel or passage 42 which in turn communicates with the diaphragm chamber 44. The supply and exhaust valve body 46 is threaded as at 48 to the base mounting and provides a supply valve seat 49 in the chamber 38. The supply valve 50 is urged toward seated position by means of a spring 52 disposed in said chamber 38, the spring being seated at one end at the seat 32 and at the other end on the spring seat 54 which floats or is loosely mounted on the operating stem 56 which is threadably secured as at 57 to the bearing portion 30 at its inner end, its outer end being secured as at 58 to the dial bushing 60.

A resilient seal washer 62 is interposed between the spring seat 54 and the valve 50 and the spring 52 tends to cause the seal washer to seize the stem 56 whereby leakage of the air in chamber 38 around the stem is prevented. The supply valve 50 is provided with an exhaust valve 64 movable with the supply valve and being adapted to seat on the exhaust valve seat 66 of the exhaust valve body 68. Said exhaust valve body is loosely contained within the head of the supply valve body 46 and is secured as by the exhaust valve nut 70 to the diaphragm plate 72 and the diaphragm 74, the diaphragm 74 being secured as at 76 to the base mounting 10 through the diaphragm ring 78.

The dial bushing 60 is provided with a cap 80 and the dial 82 is fixedly mounted to the bushing and cap. In the construction shown the calibrations indicated on the dial are each for 5° F. and by loosening screw 83 the position of the dial and member 60 can be changed so that as high as 500° F. and as low as —100° F. can be operative to affect the thermostat. The dial calibrations, which may be marked numerically, are read against the fixed indicator member 84 fixedly supported on the ring 78 as at 86.

The dial is provided with the shoulders 88 and 90 adapted to be moved to engage the stop 92 which may be conveniently provided on the square headed screw 94. When the dial is moved between the shoulders, threads 57 cause the stem 56 to move with respect to member 24 and consequently to cause bushing 60 to move toward the right or left as viewed in Figure 1. This then determines how far bushing 60 must be moved before it affects the throttling spring assembly 96.

The square headed screw 94 is provided with the throttling spring assembly 96 adapted to be rotated thereby. The throttling spring assembly is provided with the spring holder 98 which is riveted or otherwise secured as at 100 to the tops of the top and bottom throttling springs 102 and 104, said throttling springs being provided with the aligned cut-out portions 106 embracing the operating stem 56 whereby the springs may be readily moved between two positions by the screw 94.

The dial bushing 60 is provided with the boss 108 which overlies the spring 102 transversely of the slot 106 and nut 70 overlies the slot 106 of spring 104, whereby movement of the bushing 60 toward the right as viewed in Figure 1, causes deflection of the springs, or in the event the spring assembly has been rotated in a counter-clockwise direction as viewed in Figure 1, so that the boss 108 and nut 70 overlies the top or solid part of the springs and holder, compression of the top of the assembly is caused. When the spring assembly is rotated counter-clockwise to the solid position, the action of the device becomes positive, whereas when it is rotated in a clockwise direction as viewed in Figure 2, the action becomes gradual. A cover 110 may be applied to the base mounting, said cover not being air tight but preventing unauthorized tempering with the setting members and also preventing dirt and grease from entering the mechanism.

In Figure 8 there is shown, more or less diagrammatically, an application of the duct thermostat described. In this application the wall or room thermostat 130 (Figures 8, 9 and 10) is used to control the temperature of a space, for example a room, which receives its fresh air through duct 112. Room thermostat 130 is normally set, for example at 75° F., and the duct thermostat assembly above described is set at 65° F. to prevent air colder than this temperature to enter the room and cause drafts. In Figure 8 a duct 112 is shown wherein a blower 114 is mounted propelling the air in the direction of the arrow, that is, to the right as viewed in said figure. Normally open steam control valve 116 is connected through piping 118 to a steam inlet and is connected to the heating coils 120 mounted in said duct, the steam flowing in the direction of the arrow.

The steam control valve 116 is part of the steam control valve assembly 99 shown in Figure 11, and the valve comprises the valve body 101 provided with the seat 103 for valve disc 105, which control flow from pipe 118 connected at 107, to coils 120 connected at 109. Valve stem 111 connected to the disc 105 extends through stuffing box 113 and is operated by the Sylphon or bellows 115 of the control member or motor 124. Spring 117 urges the disc 105 toward open position and the bellows is enclosed in casing 119 which is adapted to be supplied with an under pressure from pipe 126 which is connected as at 121 to the casing support 123 provided on the valve casing.

Beyond the steam coils 120 the duct thermostat assembly above described is mounted as at 122, the flange 14 being secured to the duct and the tube 20 being disposed in said duct. The boss 40 of the base mounting is connected to the valve control or control motor 124 by means of the piping 126 and the boss 34 is connected through the piping 128 to the wall thermostat 130, the wall thermostat being connected through the piping 132 to the source of pressure supply (which is normally fifteen pounds).

The room thermostat 130 is provided with the usual controls whereby the piping 132 may be selectively connected or disconnected from the piping 128, depending on the setting of said wall thermostat. In Figures 9 and 10 the room thermostat 130 is illustrated comprising the base 133 provided with the temperature adjustment member 135 adapted to be rotated for adjustment and provided with the index 137 readable against the scale 139. The member 135 is provided with the shaft 141 threaded into the base 133 so that rotation of the shaft also causes reciprocation thereof. The disc lever 143 in effect is pivoted to the base and the lower leg 145 is adapted to be moved by the shaft 141 thereby moving the upper leg 147 which is adapted to engage and affect the expansion of the vapor disc 149. The harmonizing screw 151 determines the effective pivot of the lever 143 by moving lever 143 slightly. Spring 153 urges the leg 147 toward the right as viewed in Figure 10 and consequently tends to compress the disc 149 between the leg 147 and the exhaust port seat assembly 155. Assembly 155 is provided with the diaphragm 157 secured to extension 159 of the base and the assembly is provided with the exhaust valve seat 161 and exhaust outlet 163 to the atmosphere. Exhaust valve 165 is adapted to control the outlet 163 and is urged toward open position by spring 167. Diaphragm 157 with the extension 159 forms an exhaust valve chamber 169 communicating with passage 171 which is connected to pipe 128 (Figure 8). Extension 159 is also provided with the supply valve seat 173 interposed between supply valve chamber 175 and passage 177 communicating with chamber 169. Supply valve 179 controls the seat 173 and is urged toward closed position by spring 181 but said valve is provided with extension 183 contacting valve 165 whereby when the disc 149 moves diaphragm 157 toward the right in Figure 10, valve 179 is opened. The supply chamber 175 communicates with passage 185 which in turn is connected to the supply line 132 (Figure 8).

Thus assuming that the room thermostat 130 (Figures 9 and 10) is set for 75° F. and the duct thermostat 122 is set for 65° F., if the temperature at the room thermostat 130 rises above 75° F. the pressure line 132 is connected to line 128 as the vapor disc 149 will expand, moving the exhaust valve seat assembly 155 toward the right, as viewed in Figure 10, causing the valve 165 to open the valve 179. Line 128 will be connected to line 126, causing the air pressure to tend to collapse, the bellows 115 moving the valve disc 105 to closed position. If the temperature at room thermostat 130 goes below 75° F., for example, due to the cooling of coils 120 as they are cut off from the source of heat supply, the supply valve of the room thermostat closes inasmuch as the disc 149 will contract permitting the assembly 155 to move toward the left as viewed in Figure 10, whereupon the spring 181 will close the supply valve 179. The pressure will then drop at the bellows 115, and the valve disc 105 will open, due to the resiliency of the bellows 115 and the spring 117.

It is understood, of course, that the control at this duct thermostat is inoperative for so long as the air temperature in the duct is above 65° F. If the air temperature in the duct is above 65° F., an expansion of the outer tube 20 occurs. Then, inasmuch as the rod 24 does not expand, it is moved toward the right as viewed in Figure 1 causing the inlet valve 50 to be opened against the spring 52 but the exhaust valve 64 will remain closed as the dial bushing 60 will be moved toward the right and consequently diaphragm 74 and valve body 68 will be moved toward the right. Inasmuch as the valve 50 is open, air under pressure will be permitted to flow from the source of supply through the passage 36 into the supply valve chamber 38, past the valve 50 into the diaphragm chamber 44, tending to move the diaphragm 74 toward the left as viewed in Figure 1. Air under pressure will also flow through the passage 42 to the piping 126 to tend to close the valve 116 by applying pressure to the control motor 124.

Air under pressure will be supplied to the diaphragm chamber 44 until sufficient pressure is built up to either deflect the springs 102 and 104 or to compress slightly the solid top of the spring assembly, depending upon the setting of the throttling spring assembly. When sufficient pressure has been supplied to deflect said spring members or to compress the top of the assembly, the nut 70 will be moved toward the left as viewed in Figure 1, permitting the valve 50 to close. Should then a drop in temperature occur in the duct to cause the tube 20 to contract, the rod 24 will be moved toward the left as viewed in Figure 1 and the bushing 60 will be moved toward the left. Movement of the bushing toward the left will permit the spring assembly 96 to move toward its normal position whereupon air pressure on the diaphragm 74 will move it toward the left to open the exhaust valve at the seat 66 whereupon the pressure in the diaphragm chamber will bleed out along the operating stem inasmuch as there is a space between said stem and the exhaust valve body as shown at 134. Inasmuch as the pressure is bled to the atmosphere (within the cover 110) the pressure will drop in the pipe 126 to control member 124 and valve 116 will open, whereupon steam will be supplied from the inlet to the coil 120 causing the temperature of the air in the duct to be raised. Raising the temperature will then cause the tube 20 to expand moving the rod 24 to the right as viewed in Figure 1 to again open the valve 50 and close the valve 64, the diaphragm moving toward its normal position through nut 70. Air under pressure will then be supplied to the control member 124 to move the valve 116 toward the closed position.

The throttling spring assembly 96 is the means by which the sensitivity of the device is varied. Further, it is noted that the action to deflect the springs 102 and 104, or to compress the top of the spring assembly, is in a straight line, there being no intermediate levers or other mechanism so that there is no lost motion or deflection of any member which cannot be controlled.

By rotating the adjusting screw 94 in a clockwise direction, toward "G," the boss 108 is moved away from the top of the assembly, that is, is moved toward the position where the cantilever beam is the longest, thus the deflection of the springs is the greatest.

Assuming a balanced condition of the control, namely, where the valves 50 and 64 are closed and assuming a rise in temperature to open the valve 50 permitting pressure to be supplied to the diaphragm chamber 44, in the event the least sensitivity is desired, the screw 94 is moved in a clockwise direction where the boss 108 is at the lowest point of the slots 106. This establishes the condition where there is less pressure change needed in the chamber 44 to close the supply valve 50, that is, the deflection of the members 102 and 104 are the greatest. In this position of the duct thermostat there is the shortest amount of travel of the control motor 124 for any given change of temperature. This minimizes hunting, or cycling as would be caused by that condition where there is an appreciable amount of time lag between the time the valve position is changed and the time the resultant temperature is felt at the thermostat tube 20.

Movement of the screw 94 in a counter-clockwise direction where the boss 108 is at the top point of the slots 106, that is, overlying the solid portion of the assembly establishes the condition of greatest sensitivity, that is, more pressure change is needed in the chamber 44 to close the supply valve 50, therefore, there will be longer travel of the operating member 124. This setting is valuable where there are great temperature changes at the entrance of the duct 112 but a small time lag exists between the time the valve is changed and the result of the change is felt at tube 20.

Intermediate positions of the assembly of the throttling spring assembly vary the pressure conditions necessary in the diaphragm chamber 44 to close the exhaust valve 50, or in other words, intermediate sensitivities are obtained between the two extreme positions of the spring assembly.

It is to be understood that we do not wish to be limited by the exact embodiments of the device shown, which are merely by way of illustration and not limitation, as various and other forms of the device will, of course, be apparent to those skilled in the art without departing from the spirit of the invention or the scope of the claims.

We claim:

1. In a thermostat, the combination of a base mounting having a diaphragm chamber, a diaphragm closing one end of said chamber, said base mounting having a supply valve chamber spaced from and communicating with said diaphragm chamber, a supply and exhaust valve body in said mounting interposed between said chambers and having a bore therethrough through which said chambers are in communication, said exhaust valve body having a supply valve seat in said supply valve chamber, a supply valve disposed in said supply valve chamber, resilient means urging said valve to seated position, whereby when said valve is seated communication between said chambers is cut off, an exhaust valve connected with said supply valve for movement therewith, an exhaust valve body movable with said diaphragm and providing a seat for said exhaust valve, movement of the diaphragm toward the exhaust valve causing closing of the exhaust valve, movement of the diaphragm away from the exhaust valve causing opening thereof, said exhaust valve body having a bore therethrough communicating with the atmosphere when the exhaust valve is open whereby said diaphragm chamber is connected to atmosphere when said exhaust valve is open, said base mounting having a supply fitting communicating with said supply valve chamber and a control fitting communicating with said diaphragm chamber, a temperature sensitive expansible tube connected at one end to said base mounting and closed at the opposite end, a non-expansible member disposed in said tube and connected at one end to the closed end of said tube, an operating stem connected to the other end of said non-expansible member for relative movement with respect thereto, said stem extending through said base mounting, said valves and said diaphragm, and being provided with a bushing secured to said stem, and means of varying flexibility interposed between said diaphragm and bushing and movable with respect to said bushing for selectively and variably resisting movement of said bushing by said tube.

2. In a thermostat, the combination of a base mounting having a diaphragm chamber and a supply chamber spaced from and communicating with said diaphragm chamber, said mounting having a supply passage to said supply chamber and said mounting having a control passage to said diaphragm chamber, a supply valve for controlling supply from said supply chamber to said diaphragm chamber, resilient means for urging said valve to closed position, a diaphragm closing said diaphragm chamber, an exhaust valve member communicating with said diaphragm chamber and atmosphere, said exhaust valve member having an exhaust valve seat, an exhaust valve movable with said supply valve and opening and closing said exhaust valve seat for controlling exhaust from said diaphragm chamber to atmosphere, and control means for controlling operation of said diaphragm and exhaust valve, said control means including a temperature sensitive expansible member secured to said base mounting, a non-expansible member movable by the expansible member, means of selective and variable resistance for resisting expansion of said expansible member, and means carried by said non-expansible member adjustable to vary the compression between said last named means and said means of variable resistance for varying the sensitivity of said thermostat.

3. In a thermostat, the combination of a base mounting having a diaphragm chamber and a supply chamber spaced from and communicating with said diaphragm chamber, said mounting having a supply passage to said supply chamber and said mounting having a control passage to said diaphragm chamber, a supply valve for controlling supply from said supply chamber to said diaphragm chamber, resilient means for urging said valve to closed position, a diaphragm closing said diaphragm chamber, an exhaust valve seat member movable with said diaphragm and communicating with said diaphragm chamber and atmosphere, said exhaust valve seat member having an exhaust valve seat, an exhaust valve adapted to seat on said exhaust valve seat for controlling exhaust from said diaphragm chamber to atmosphere, and control means for controlling operation of said diaphragm and exhaust valve, said control means including a temperature sensitive expansible member secured to said base mounting, a non-expansible member movable by the expansible member, means of selective and variable resistance for resisting expansion of said expansible member, and means carried by said non-expansible member adjustable to vary the compression between said last named means and said means of variable resistance for varying the sensitivity of said thermostat.

4. In a thermostat, the combination of a base mounting having a diaphragm chamber and a supply chamber spaced from and communicating with said diaphragm chamber, said mounting having a supply passage to said supply chamber and said mounting having a control passage to said diaphragm chamber, a supply valve for controlling supply from said supply chamber to said diaphragm chamber, resilient means for urging said valve to closed position, a diaphragm closing said diaphragm chamber, an exhaust valve seat member movable with said diaphragm and communicating with said diaphragm chamber and atmosphere, said exhaust valve seat member having an exhaust valve seat, an exhaust valve movable with said supply valve and adapted to seat on said exhaust valve seat for controlling exhaust from said diaphragm chamber to atmosphere, and control means for controlling operation of said diaphragm and exhaust valve, said control means including a temperature sensitive expansible member secured to said base mounting, a non-expansible member movable by the expansible member, means of selective and variable resistance for resisting expansion of said expansible member, and means carried by said non-expansible member adjustable to vary the compression between said last named means and said means of variable resistance for varying the sensitivity of said thermostat.

5. In a thermostat, the combination of a base mounting having a diaphragm chamber and a supply chamber spaced from and communicating with said diaphragm chamber, said mounting having a supply passage to said supply chamber and a control passage to said diaphragm chamber, a supply valve for controlling supply from said supply chamber to said diaphragm chamber, resilient means for urging said valve to closed position, a diaphragm closing said diaphragm chamber, an exhaust valve seat member communicating with said diaphragm chamber and atmosphere, said exhaust valve seat member having an exhaust valve seat, an exhaust valve for said exhaust valve seat for controlling exhaust from said diaphragm chamber to atmosphere, control means for controlling operation of said diaphragm and exhaust valve, said control means including a temperature sensitive expansible member secured to said base mounting, a non-expansible member movable by the expansible member, means of selective and variable resistance for resisting expansion of said expansible member, and means carried by said non-expansible member adjustable and operative in alignment with said non-expansible member and said valves to vary the compression between said last named means and said means of variable resistance for varying the sensitivity of said thermostat.

6. In a thermostat, the combination of a base mounting having a diaphragm chamber and a supply chamber spaced from and communicating with said diaphragm chamber, said mounting having a supply passage to said supply chamber and a control passage to said diaphragm chamber, a supply valve for controlling supply from said supply chamber to said diaphragm chamber, resilient means for urging said valve to closed position, a diaphragm closing said diaphragm chamber, an exhaust valve member communicating with said diaphragm chamber and atmosphere, said exhausting valve member having an exhaust valve seat, an exhaust valve movable with said supply valve for controlling exhaust from said diaphragm chamber to atmosphere, and control means for controlling operation of said diaphragm and exhaust valve, said control means including a temperature sensitive expansible member secured to said base mounting, a non-expansible member movable by the expansible member, means of selective and variable resistance for resisting expansion of said expansible member, means carried by said non-expansible member adjustable and operative in alignment with said non-expansible member and said valves to vary the compression between said last named means and said means of variable resistance for varying the sensitivity of said thermostat.

7. In a thermostat, the combination of a base mounting having a diaphragm chamber and a supply chamber spaced from and communicating with said diaphragm chamber, said mounting having a supply passage to said supply chamber and said mounting having a control passage to said diaphragm chamber, a supply valve for controlling supply from said supply chamber to said diaphragm chamber, resilient means for urging said valve to closed position, a diaphragm closing said diaphragm chamber, an exhaust valve seat member movable with said diaphragm and communicating with said diaphragm chamber and atmosphere, said exhaust valve seat member having an exhaust valve seat, an exhaust valve adapted to seat on said exhaust valve seat for controlling exhaust from said diaphragm chamber to atmosphere, control means for controlling operation of said diaphragm and exhaust valve, said control means including a temperature sensitive expansible member secured to said base mounting, a non-expansible member movable by the expansible member, means of selective and variable resistance for resisting expansion of said expansible member and means carried by said non-expansible member adjustable and operative in alignment with said non-expansible member and said valves to vary the compression between said last named means and said means of variable resistance for varying the sensitivity of said thermostat.

8. In a thermostat, the combination of a base mounting having a diaphragm chamber and a supply chamber spaced from and communicating with said diaphragm chamber, said mounting having a supply passage to said supply chamber and a control passage to said diaphragm chamber, a supply valve for controlling supply from said supply chamber to said diaphragm chamber, resilient means for urging said valve to closed position, a diaphragm closing said diaphragm chamber, an exhaust valve seat member movable with said diaphragm and communicating with said diaphragm chamber and atmosphere, said exhaust valve seat member having an exhaust valve seat, an exhaust valve movable with said supply valve and adapted to seat on said exhaust valve seat for controlling exhaust from said diaphragm chamber to atmosphere, control means for controlling operation of said diaphragm and exhaust valve, said control means including a temperature sensitive expansible member secured to said base mounting, a non-expansible member movable by the expansible member, means of selective and variable resistance for resisting expansion of said expansible member, means carried by said non-expansible member adjustable and operative in alignment with said non-expansible member and said valves to vary the compression between said last named means and said means of variable resistance for varying the sensitivity of said thermostat.

9. In a thermostat, the combination of a base mounting having a diaphragm chamber and a supply chamber spaced from and communicating with said diaphragm chamber, said mounting having a supply passage to said supply chamber and said mounting having a control passage to said diaphragm chamber, a supply valve for controlling supply from said supply chamber to said diaphragm chamber, resilient means for urging said valve to closed position, a diaphragm closing said diaphragm chamber, an exhaust valve seat member movable with said diaphragm and communicating with said diaphragm chamber and atmosphere, said exhaust valve seat member having an exhaust valve seat, an exhaust valve movable with said supply valve and adapted to seat on said exhaust valve seat for controlling exhaust from said diaphragm chamber to atmosphere, control means for controlling operation of said diaphragm and exhaust valve, said control means including a temperature sensitive expansible member secured to said base mounting, a non-expansible member movable by the expansible member, an adjustable member movably connected to said non-expansible member and disposed in alignment therewith and adjustable toward and away from said diaphragm, and resilient means of selectable and variable resilience interposed between said diaphragm and adjustable member for resisting movement of said non-expansible member to thereby variably transmit the movement of said expansible member to said diaphragm.

10. In a thermostat, the combination of a base mounting having a diaphragm chamber and a supply chamber spaced from and communicating with said diaphragm chamber, said mounting having a supply passage to said supply chamber and a control passage to said diaphragm chamber, a supply valve for controlling supply from said supply chamber to said diaphragm chamber, resilient means for urging said valve to closed position, a diaphragm closing said diaphragm chamber, an exhaust valve seat member communicating with said diaphragm chamber and atmosphere, said exhaust valve seat member having an exhaust valve seat, an exhaust valve for said exhaust valve seat for controlling exhaust from said diaphragm chamber to atmosphere, control means for controlling operation of said diaphragm and exhaust valve, said control means including a temperature sensitive expansible member secured to said base mounting, a non-expansible member movable by the expansible member, an adjustable member movably connected to said non-expansible member and disposed in alignment therewith and adjustable toward and away from said diaphragm, and resilient means of selectable and variable resilience interposed between said diaphragm and adjustable member for resisting movement of said non-expansible member to thereby variably transmit the movement of said expansible member to said diaphragm.

11. In a thermostat, the combination of a base mounting having a diaphragm chamber and a supply chamber spaced from and communicating with said diaphragm chamber, said mounting having a supply passage to said supply chamber and said mounting having a control passage to said diaphragm chamber, a supply valve for controlling supply from said supply chamber to said diaphragm chamber, resilient means for urging said valve to closed position, a diaphragm closing said diaphragm chamber, an exhaust valve seat member movable with said diaphragm and communicating with said diaphragm chamber and atmosphere, said exhaust valve seat member having an exhaust valve seat, an exhaust valve adapted to seat on said exhaust valve seat for controlling exhaust from said diaphragm chamber to atmosphere, and control means for controlling operation of said diaphragm and exhaust valve, said control means including a temperature sensitive expansible member secured to said base mounting, a non-expansible member movable by the expansible member, an adjustable member movably connected to said non-expansible member and disposed in alignment therewith and adjustable toward and away from said diaphragm, and resilient means of selectable and variable resilience interposed between said diaphragm and adjustable member for resisting movement of said non-expansible member to thereby variably transmit the movement of said expansible member to said diaphragm.

12. In a thermostat, the combination of a base mounting having a diaphragm chamber and a supply chamber spaced from and communicating with said diaphragm chamber, said mounting having a supply passage to said supply chamber and a control passage to said diaphragm chamber, a supply valve for controlling supply from said supply chamber to said diaphragm chamber, resilient means for urging said valve to closed position, a diaphragm closing said diaphragm chamber, an exhaust valve seat member communicating with said diaphragm chamber and atmosphere, said exhaust valve seat member having an exhaust valve seat, an exhaust valve for said exhaust valve seat for controlling exhaust from said diaphragm chamber to atmosphere, control means for controlling operation of said diaphragm and exhaust valve, said control means including a temperature sensitive expansible member secured to said base mounting, a non-expansible member movable by the expansible member, an adjustable member movably connected to said non-expansible member and disposed in alignment therewith and adjustable toward and away from said diaphragm, and resilient means of selectable and variable resilience interposed between said diaphragm and adjustable member for resisting movement of said non-expansible member to thereby variably transmit the movement of said expansible member to said diaphragm, and means whereby said adjustable member is relatively moved with respect to said non-expansible member for obtaining wide limits of calibration of the thermostat.

13. In a thermostat, the combination of a base mounting having a diaphragm chamber and a supply chamber spaced from and communicating with said diaphragm chamber, said mounting having a supply passage to said supply chamber and a control passage to said diaphragm chamber, a supply valve for controlling supply from said supply chamber to said diaphragm chamber, resilient means for urging said valve to closed position, a diaphragm closing said diaphragm chamber, an exhaust valve seat member communicating with said diaphragm chamber and atmosphere, said exhaust valve seat member having an exhaust valve seat, an exhaust valve for said exhaust valve seat for controlling exhaust from said diaphragm chamber to atmosphere, and control means for controlling operation of said diaphragm and exhaust valve for controlling exhaust from said diaphragm chamber to atmosphere, said last named control means including a temperature sensitive expansible member secured to said base mounting, a non-expansible member movable by the expansible member, means of selective variable resistance for resisting expansion of said expansible member, and means carried by said non-expansible member adjustable to vary the compression between said last named means and said means of variable resistance for varying the sensitivity of said thermostat.

ERWIN SABALLUS.
CARL WM. FISCHER.